US012180765B2

(12) United States Patent
Stefano

(10) Patent No.: US 12,180,765 B2
(45) Date of Patent: Dec. 31, 2024

(54) FURNITURE HINGE

(71) Applicant: MOLTENI & C. S.P.A., Giussano (IT)

(72) Inventor: Invernizzi Stefano, Giussano (IT)

(73) Assignee: MOLTENI & C. S.P.A., Giussano (IT)

( * ) Notice: Subject to any disclaimer, the term of this patent is extended or adjusted under 35 U.S.C. 154(b) by 20 days.

(21) Appl. No.: 18/105,310

(22) Filed: Feb. 3, 2023

(65) Prior Publication Data

US 2023/0250683 A1 Aug. 10, 2023

(30) Foreign Application Priority Data

Feb. 8, 2022 (IT) ........................ 102022000002237

(51) Int. Cl.
*E05D 7/06* (2006.01)
*E05D 7/04* (2006.01)

(52) U.S. Cl.
CPC ........... *E05D 7/0423* (2013.01); *E05D 7/043* (2013.01); *E05D 2007/0469* (2013.01); *E05D 2007/0476* (2013.01); *E05Y 2900/20* (2013.01)

(58) Field of Classification Search
CPC ......... E05D 7/04; E05D 7/0423; E05D 7/043; E05D 7/0027; E05D 7/0045; E05D 7/0009; E05D 7/12; E05D 3/02; E05D 5/02; E05D 5/0215; E05D 5/0223; E05D 5/023; E05D 5/06; E05D 11/0054; E05D 2007/0461; E05D 2007/0469; E05D 2007/0476; E05Y 2600/10; E05Y 2600/502; E05Y 2900/132; E05Y 2900/148; E05Y 2600/12; E05Y 2600/61; E05Y 2600/622; E05Y 2900/20; E05Y 16/236–24; E05Y 16/245–246
See application file for complete search history.

(56) References Cited

U.S. PATENT DOCUMENTS 3,016,563 A * 1/1962 De Jong ................ E05D 5/065 16/320
3,579,934 A * 5/1971 Pietsch .................. E05C 19/16 49/394
3,618,993 A * 11/1971 Platte ...................... F16B 12/26 52/285.3

(Continued)

FOREIGN PATENT DOCUMENTS

DE 10323782 B3 * 9/2004 .............. E05D 7/04
EP 0456314 A1 5/1991

(Continued)

*Primary Examiner* — Chuck Y Mah
(74) *Attorney, Agent, or Firm* — CANTOR COLBURN LLP

(57) ABSTRACT

A hinge for a piece of furniture including at least one shoulder and at least one door, said hinge having a first hinge body and a second hinge body, where the first hinge body is connectable to the at least one shoulder of the piece of furniture and the second hinge body is connectable to the at least one door of the piece of furniture, wherein the first hinge body and the second hinge body are operatively connected to each other and relatively movable by means of adjustment means, wherein one of the first hinge body and the second hinge body includes a cross element, and the other of the first hinge body or the second hinge body defines a cross guide, where the cross element is housed in the cross guide, and wherein the cross element slides in the cross guide by means of the adjustment means.

21 Claims, 7 Drawing Sheets

(56) References Cited

U.S. PATENT DOCUMENTS

| | | | | | |
|---|---|---|---|---|---|
| 3,863,292 | A * | 2/1975 | Grunert | E05D 7/0407 16/236 |
| 4,142,271 | A | 3/1979 | Busse | |
| 4,407,044 | A * | 10/1983 | Iseki | E05D 11/1014 16/237 |
| 4,799,290 | A * | 1/1989 | Lautenschlager, Jr. | E05D 7/125 16/241 |
| 5,062,180 | A * | 11/1991 | Lautenschlager, Jr. | E05D 7/125 16/257 |
| 5,224,242 | A * | 7/1993 | Marjanovic | E05D 7/125 16/DIG. 43 |
| 5,694,665 | A | 12/1997 | Strickland | |
| 5,755,011 | A * | 5/1998 | Green | E05D 7/0423 16/241 |
| 5,806,144 | A * | 9/1998 | Fries | E05D 7/12 16/246 |
| 6,647,591 | B1 * | 11/2003 | Domenig | E05D 7/0415 16/242 |
| 7,334,293 | B2 * | 2/2008 | Erickson | E05D 7/0423 16/245 |
| 9,121,207 | B2 * | 9/2015 | Stuart | E05D 3/12 |
| 9,759,000 | B2 * | 9/2017 | Stuart | E05D 5/06 |
| 10,458,165 | B1 * | 10/2019 | Tsai | E05D 7/04 |
| 2001/0011406 | A1 * | 8/2001 | Nakamoto | E05D 7/0027 16/271 |
| 2004/0128794 | A1 * | 7/2004 | Chung | E05D 7/0423 16/236 |
| 2005/0060841 | A1 * | 3/2005 | Chen | E05D 7/0407 16/240 |
| 2005/0144758 | A1 | 7/2005 | Herper | |
| 2008/0104798 | A1 * | 5/2008 | Hoppe | E05D 7/0027 16/236 |
| 2008/0307606 | A1 * | 12/2008 | Karlsson | E05D 7/0415 16/245 |
| 2010/0242227 | A1 * | 9/2010 | Tagtow | E05D 7/0423 16/245 |
| 2011/0296652 | A1 * | 12/2011 | Zhang | E05D 7/0423 16/239 |
| 2013/0305488 | A1 * | 11/2013 | Dodge | G16Z 99/00 16/245 |
| 2015/0135480 | A1 * | 5/2015 | Bartels | E05D 7/04 16/237 |
| 2022/0120125 | A1 * | 4/2022 | Lenze | E05D 7/0423 |

FOREIGN PATENT DOCUMENTS

| | | | | |
|---|---|---|---|---|
| EP | 0437750 | A1 | | 7/1991 |
| EP | 1243214 | A2 | | 9/2002 |
| GB | 2028914 | A | | 3/1980 |
| IT | UB20160247 | A1 | | 8/2017 |
| JP | H08151881 | A | * | 6/1996 |
| JP | 2002129822 | A | * | 5/2002 |
| JP | 2003013656 | A | * | 1/2003 |

* cited by examiner

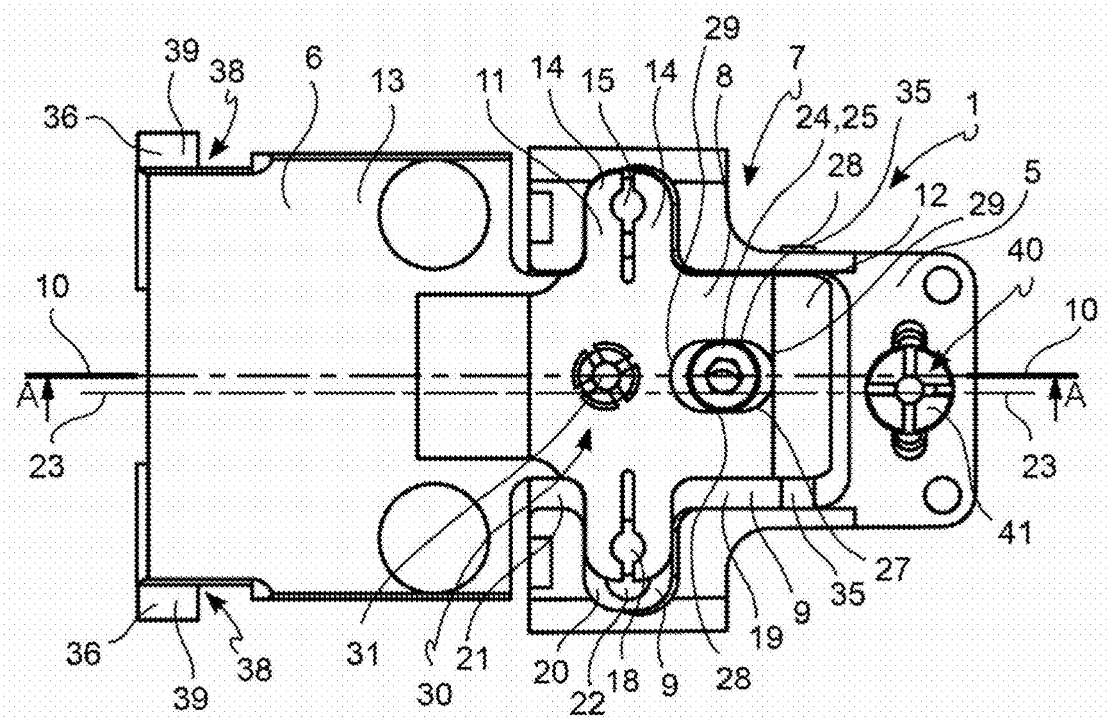
FIG. 3
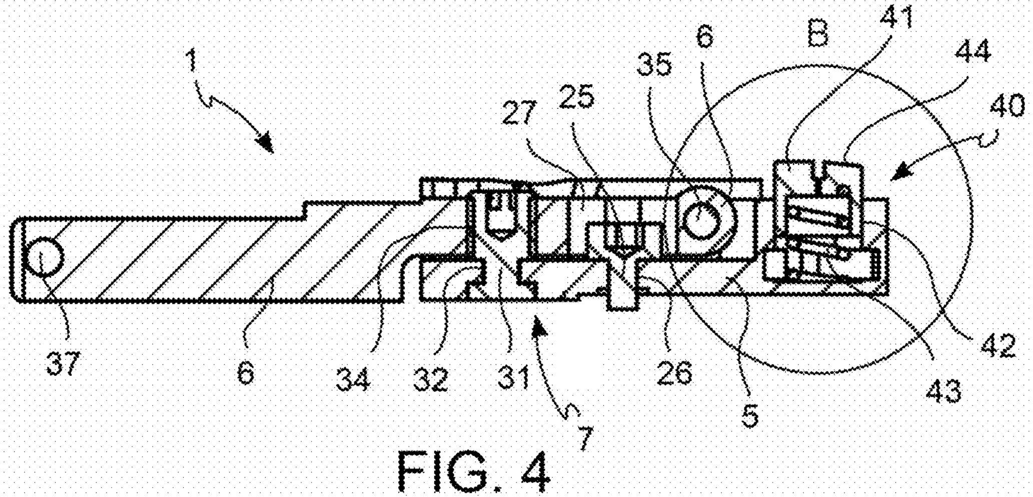
FIG. 4
FIG. 5
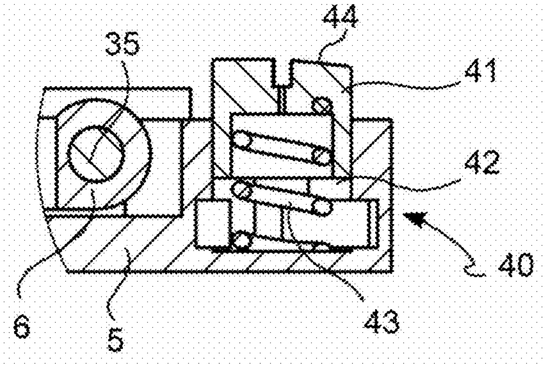

FURNITURE HINGE

FIELD OF THE INVENTION

The present invention relates to a furniture hinge.

BACKGROUND ART

Furniture hinge types comprising two hinge bodies are known, a first hinge body of which is integral with a shoulder of the piece of furniture, and a second hinge body of which is integral with a door of the piece of furniture. The hinge allows the relative movement, and therefore the opening and closing, of the door with respect to the piece of furniture.

A problem encountered in known hinges, and mainly concerning high end furniture, is to ensure a correct alignment and positioning of the door with respect to the shoulder of the piece of furniture, so as to ensure a precise and stable movement of the door.

Furniture hinges of the adjustable type are known, i.e., adapted to adjust the relative position of the door with respect to the shoulder of the piece of furniture. Such adjustable hinges generally comprise a first hinge body connected to the shoulder of the piece of furniture and a second hinge body connected to the door of the piece of furniture, and the adjustment of the relative positioning between the first and second hinge bodies is performed by a plurality of adjustment screws, as shown by document IT201700035374, for example.

However, solutions of this type have proved to be unsatisfactory for achieving a precise and reliable adjustment of the positioning of the door with respect to the shoulder of the piece of furniture.

The need is thus felt to provide a hinge for connecting a door to a shoulder of a piece of furniture, which allows precisely adjusting the positioning of the door with respect to the piece of furniture.

SOLUTION

It is the object of the present invention to provide a furniture hinge such as to obviate at least some of the drawbacks of the prior art.

It is a particular object of the present invention to provide a furniture hinge which allows more precisely adjusting the relative positioning between the door and the shoulder of the piece of furniture.

These and other objects are achieved by a furniture hinge according to independent claim 1.

The dependent claims relate to preferred and advantageous embodiments of the present invention.

In order to better understand the invention and appreciate the advantages thereof, some non-limiting exemplary embodiments thereof will be described below with reference to the accompanying drawings, in which:

FIG. 3 is a front view of the furniture hinge depicted in FIG. 1;

FIG. 4 is a longitudinal sectional view of the furniture hinge depicted in FIG. 3;

FIG. 5 is a detailed view of the furniture hinge depicted in FIG. 4;

Figure 1:
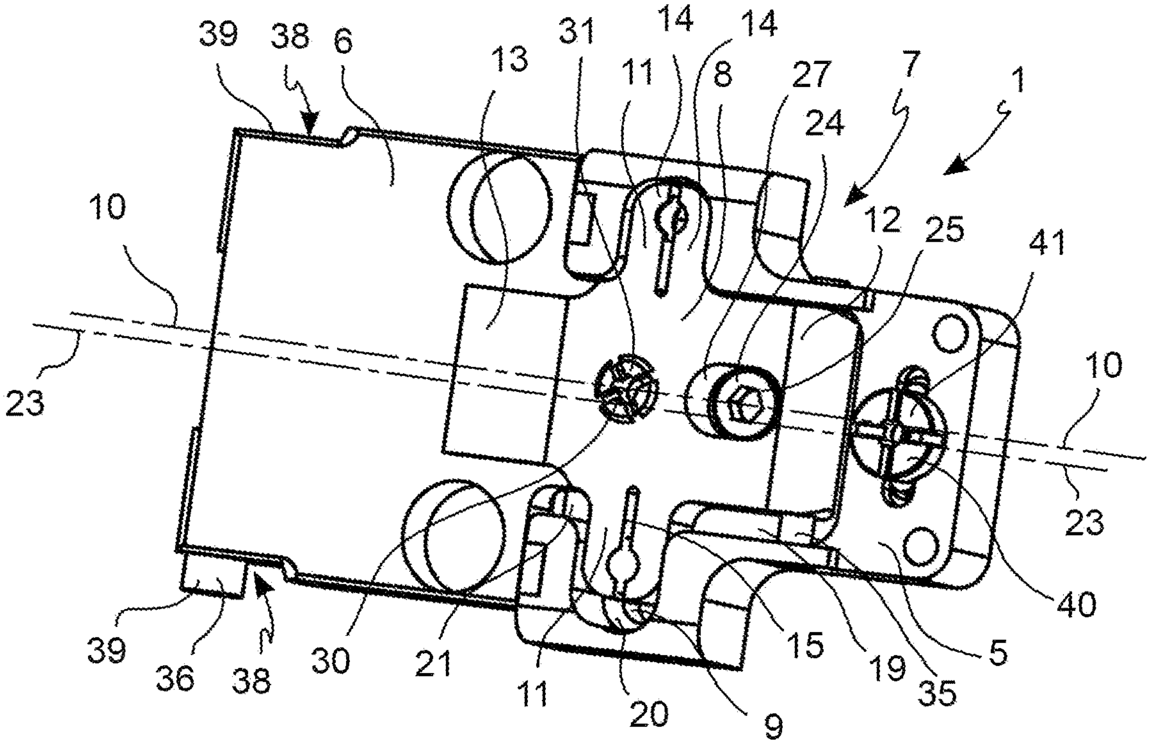
FIG. 1 shows a front perspective view of a furniture hinge, according to an embodiment of the invention.
Figure 2:
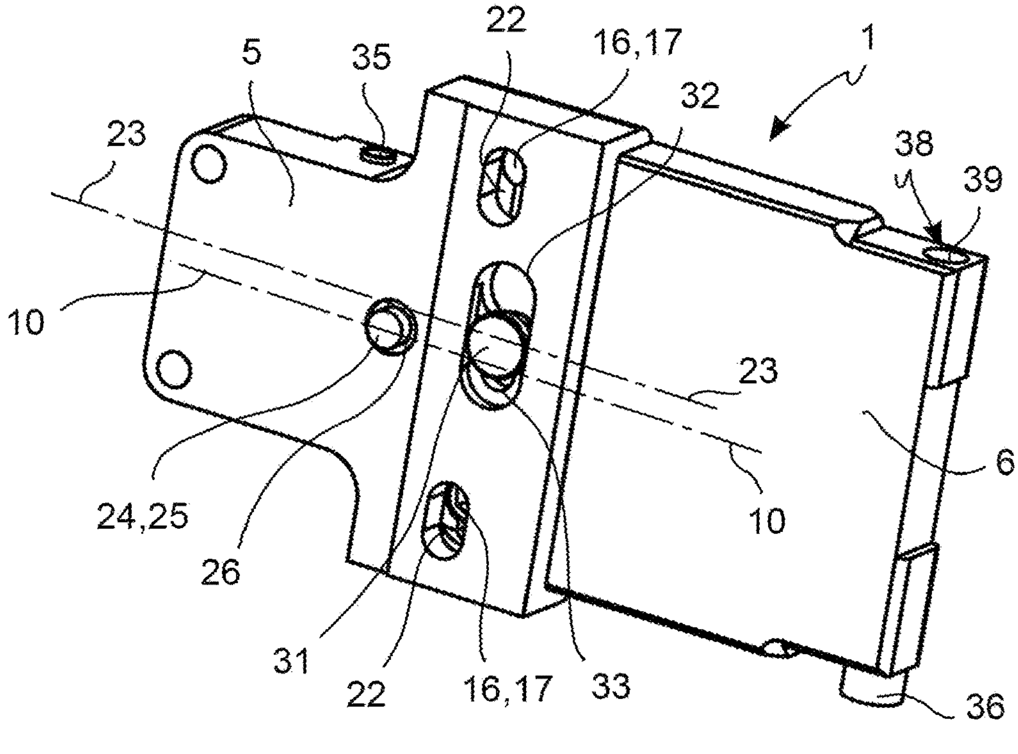
FIG. 2 is a rear perspective view of the furniture hinge depicted in FIG. 1.
Figure 6:
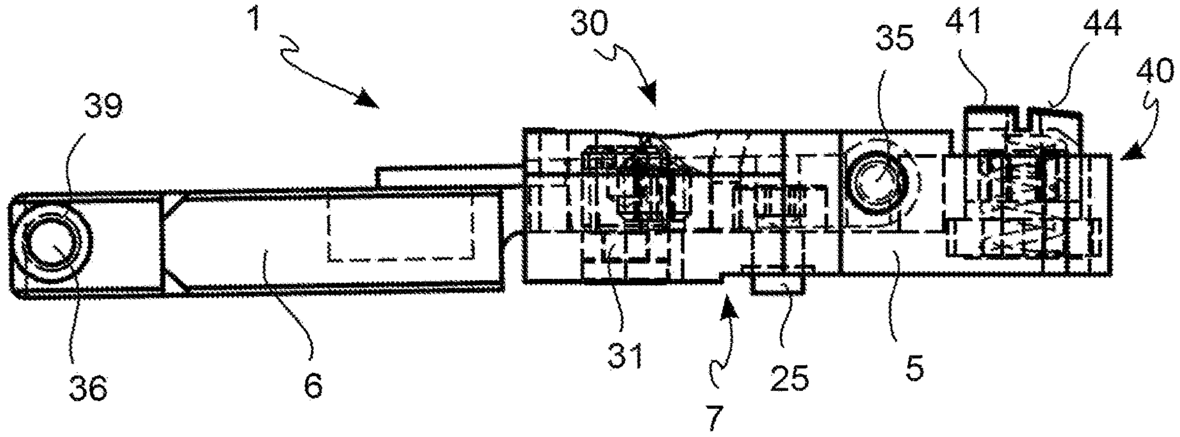
FIG. 6 is a side view of a furniture hinge, showing visible and non-visible details, in a first operating configuration, according to an embodiment of the invention.
Figure 7:
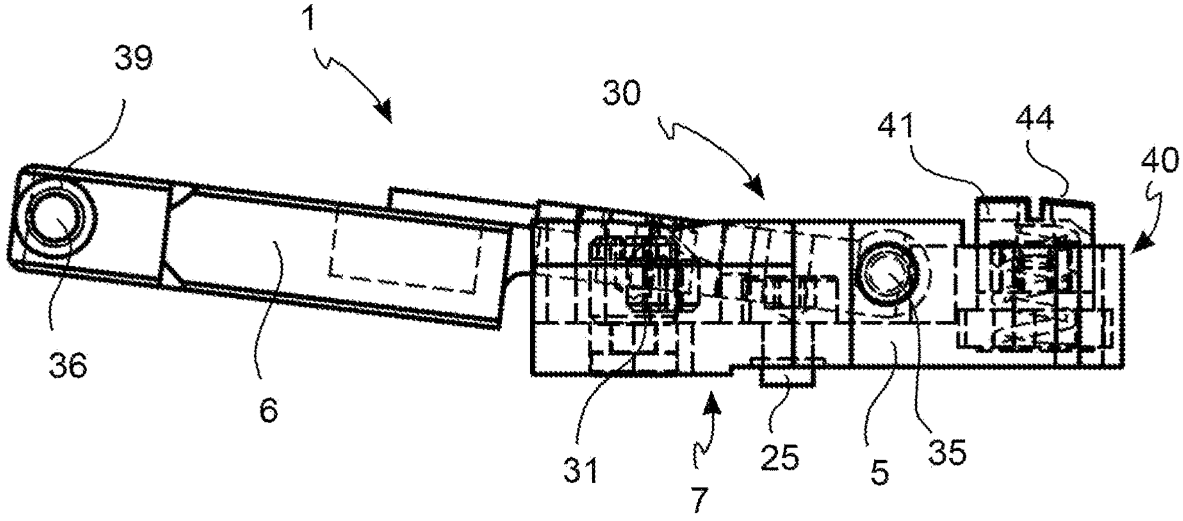
FIG. 7 is a side view of the furniture hinge depicted in FIG. 6, showing visible and non-visible details, according to a second operating configuration.
Figure 8:
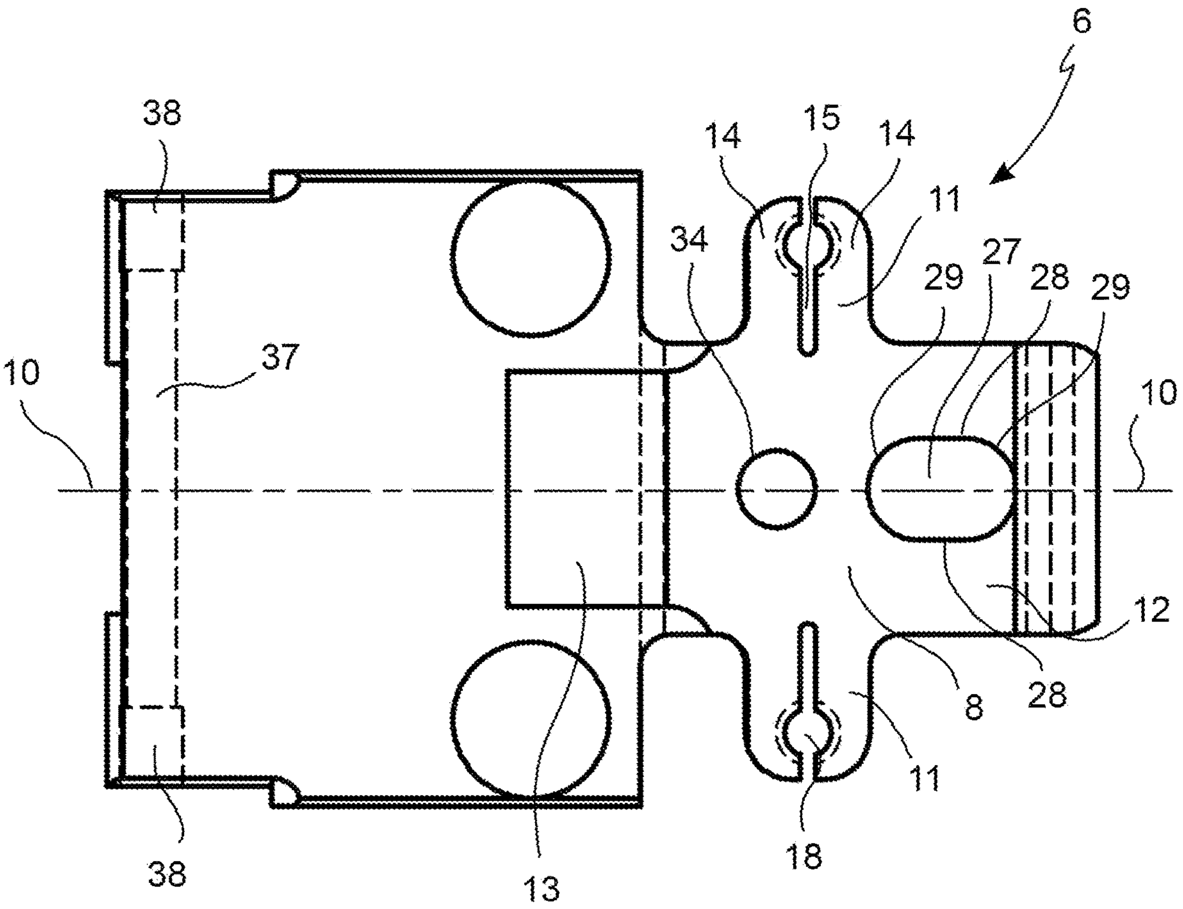
FIG. 8 is a front view of a component of a furniture hinge, according to an embodiment of the invention.
Figure 9:
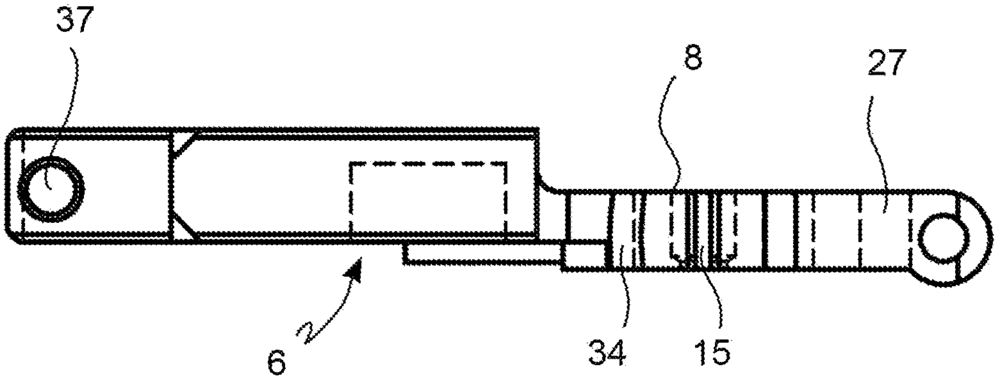
FIG. 9 is a side view of the component depicted in FIG. 8.
Figure 10:
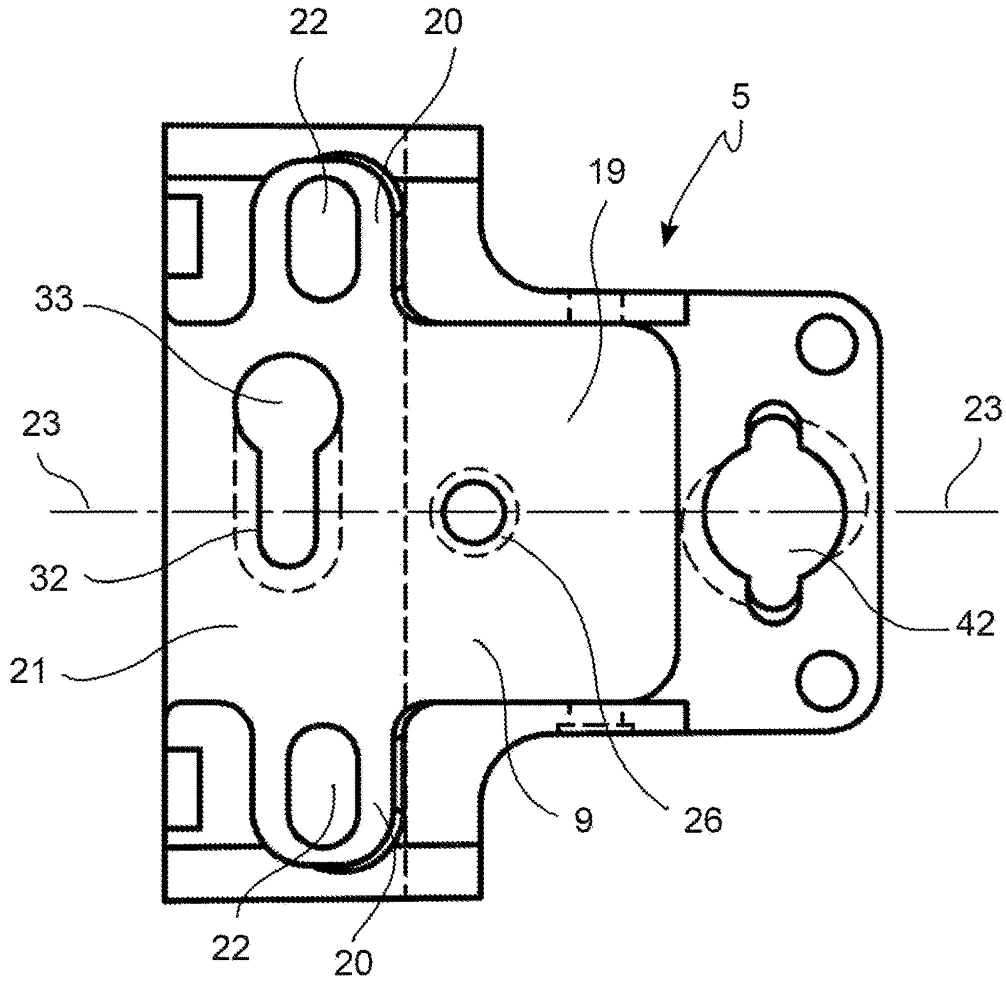
FIG. 10 is a front view of a further component of a furniture hinge, according to an embodiment of the invention.
Figure 11:
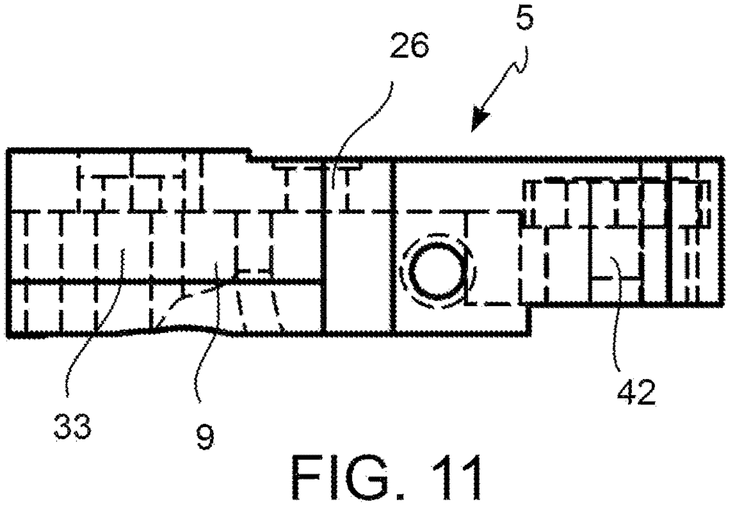
FIG. 11 is a side view of the component depicted in FIG. 10.
Figure 12:
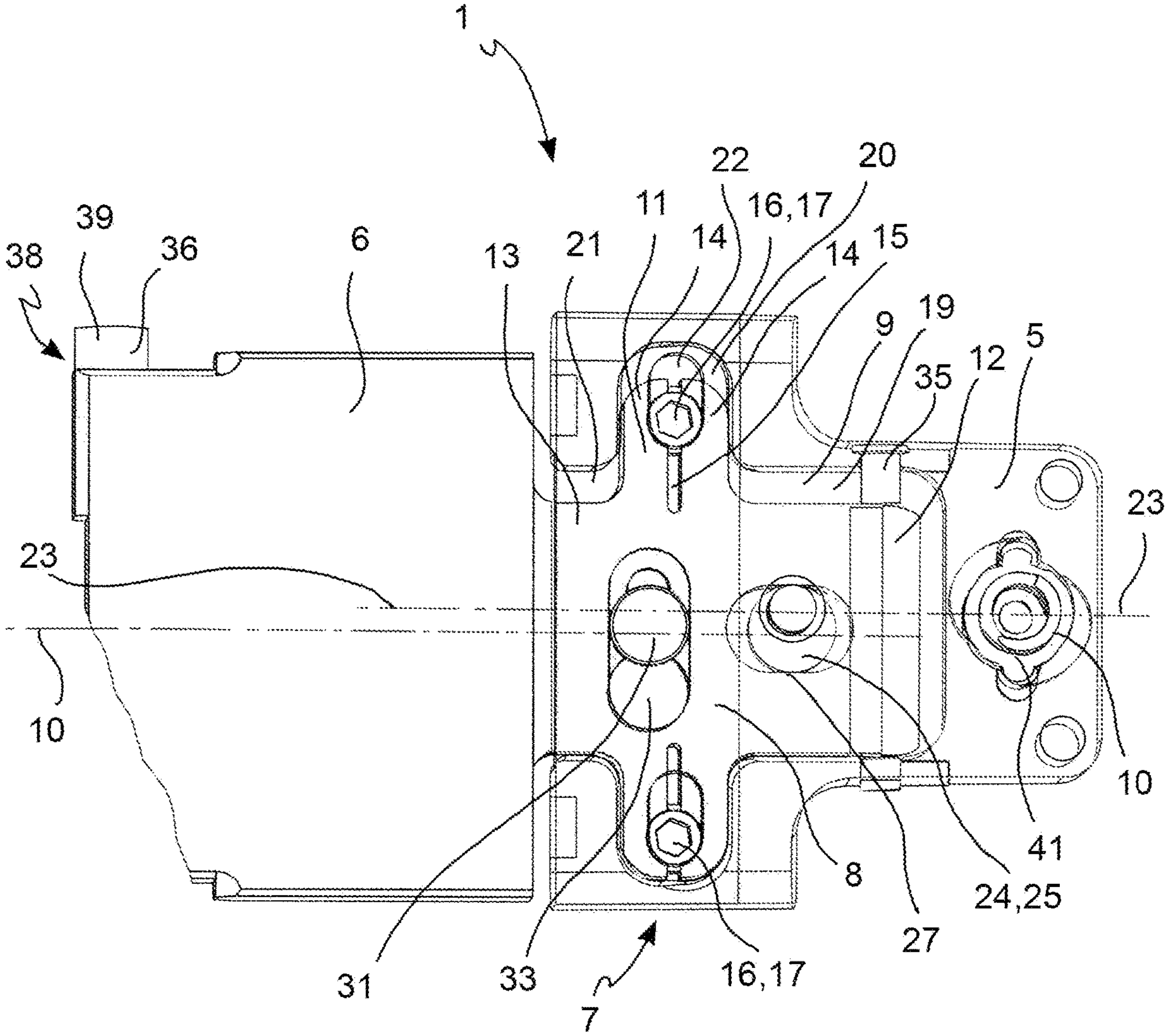
FIG. 12 is a front view of a furniture hinge, according to an embodiment of the invention.
Figure 13:
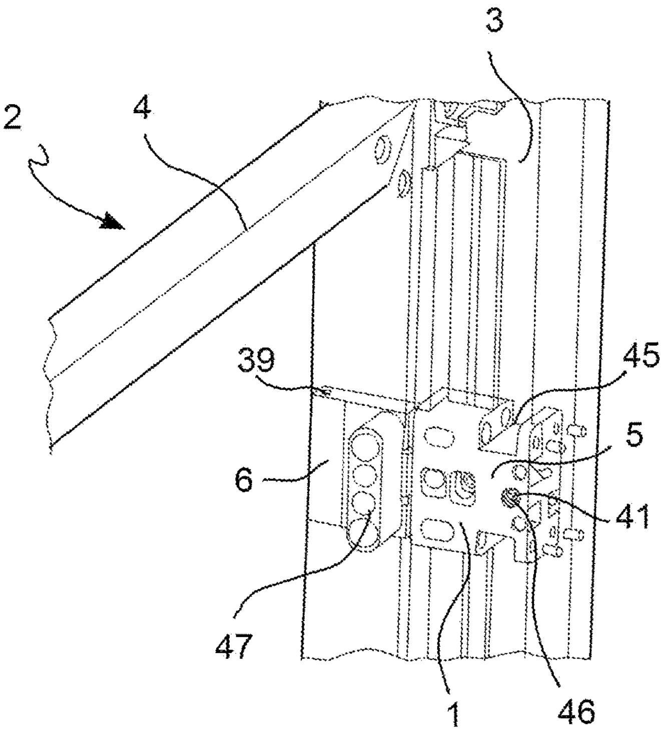
FIG. 13 is a detailed view of a piece of furniture, according to an embodiment of the invention.
Figure 14:
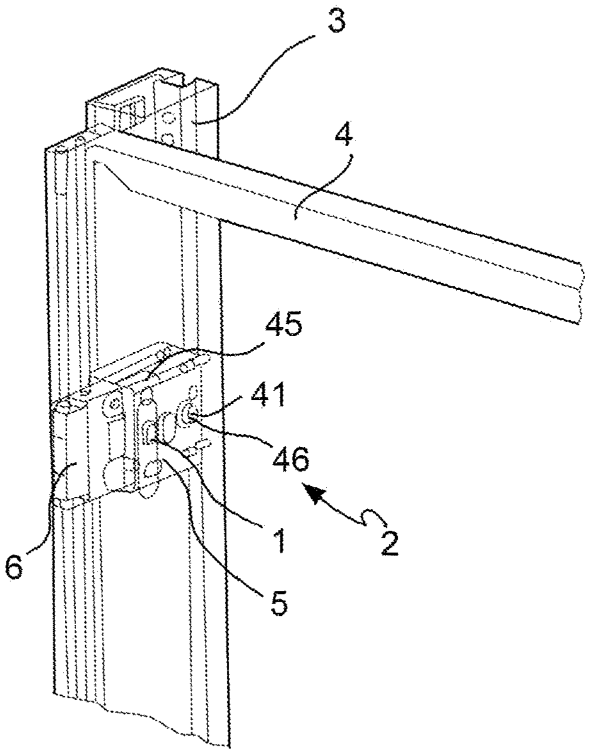
FIG. 14 is a further detailed view of a piece of furniture, according to an embodiment of the invention.
Figure 15:
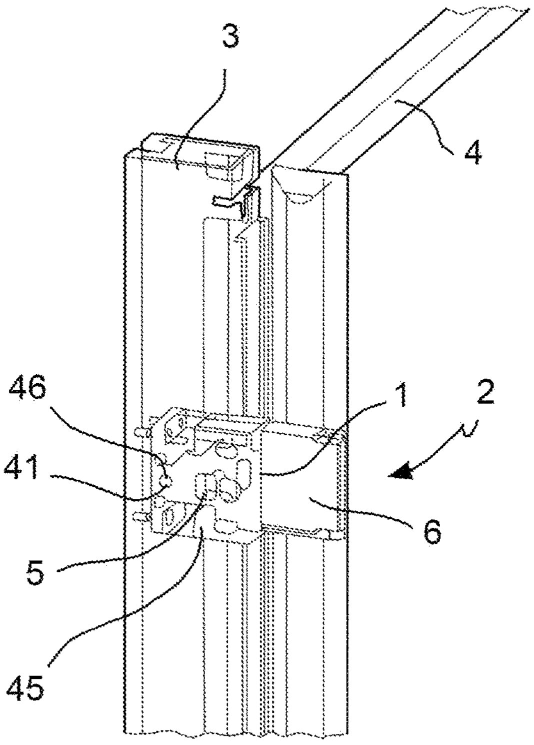
FIG. 15 is a further detailed view of a piece of furniture, according to an embodiment of the invention.

With reference to the drawings, a hinge is generally indicated by reference numeral 1.

The hinge 1 is for a piece of furniture 2 of the type comprising at least one shoulder 3 and at least one door 4.

The hinge 1 comprises a first hinge body 5 and a second hinge body 6.

The first hinge body 5 is connectable to the at least one shoulder 3 of the piece of furniture 2, whereas the second hinge body 6 is connectable to the at least one door 4 of the piece of furniture 2.

The first hinge body 5 and the second hinge body 6 are operatively connected to each other and relatively movable by means of adjustment means 7.

According to an aspect of the invention, one of the first hinge body 5 and the second hinge body 6 comprises a cross element 8.

The other of the first hinge body 5 and the second hinge body 6 defines a cross guide 9.

The cross element 8 is housed in the cross guide 9.

Moreover, the cross element 8 is slidable in the cross guide 9 by means of the adjustment means 7.

Advantageously, a thus-configured hinge 1 allows precisely and reliably adjusting the positioning of the at least one door 4 with respect to the at least one shoulder 3 of the piece of furniture 2.

In fact, the cross guide 9 guides the sliding of the cross element 8, avoiding misalignments during the adjustment of the positioning of the at least one door 4 with respect to the at least one shoulder 3.

According to an embodiment, the first hinge body 5 defines the cross guide 9, and the second hinge body 6 comprises the cross element 8.

According to a preferred embodiment, the cross element 8 is made in one piece with the second hinge body 6.

Advantageously, the one-piece construction of the cross element 8 with the second hinge body 6 reduces the clearances between the first hinge body 5 and the second hinge body 6, and further increases the adjustment precision of the positioning of the second hinge body 6 with respect to the first hinge body 5.

According to an embodiment, the first hinge body 5 is substantially symmetrical with respect to a first axis of symmetry 23.

According to an embodiment, the second hinge body 6 defines a second axis of symmetry 10.

According to an embodiment, when the hinge 1 is in the assembled configuration, the first axis of symmetry 23 is parallel to the second axis of symmetry 10.

The cross element 8 forms two cross arms 11 extending in a transverse direction with respect to the second axis of symmetry 10, and opposite to each other with respect to the second axis of symmetry 10.

Moreover, the cross element 8 forms a cross head 12 extending in the direction of the second axis of symmetry 10 and facing the first hinge body 5.

Moreover, the cross element 8 forms a cross foot 13 extending in the direction of the second axis of symmetry 10 and opposite to the cross head 12.

The first hinge body 5 defines a cross guide 9 shaped so as to provide a geometric coupling with the cross element 8 and for accommodating the adjustment stroke of the cross element 8, in a direction transverse to the first axis of symmetry 23.

In particular, the cross guide 9 defines a head guide 19 shaped to house the cross head 12 and accommodate the stroke of the cross head 12 in a direction transverse to the first axis of symmetry 23.

Moreover, the cross guide 9 defines two arm guides 20 shaped to house the respective cross arms 11 and accommodate the stroke of the cross arms 11 in a direction transverse to the first axis of symmetry 23.

Moreover, the cross guide 9 defines a foot guide 21 shaped to house the cross foot 13 and accommodate the stroke of the cross foot 13 in a direction transverse to the first axis of symmetry 23.

According to an embodiment, each cross arm 11 forms two foils 14 divided from each other by a slit 15 extending from an end of the cross arm 11 in the direction of the second axis of symmetry 10.

The adjustment means 7 comprise a calibration member 16 positioned at each slit 15 and configured to adjust the spacing between the two foils 14 of each cross arm 11.

Advantageously, the adjustment of the distance between the two foils 14 allows further reducing the clearances between the cross element 8 and the cross guide 9 during the adjustment of the mutual relative position thereof.

According to an embodiment, the calibration member 16 comprises a conical dowel 17 being screwable in a dowel seat 18 defined at each slit 15.

The conical dowel 17 is configured so that, when screwed into the dowel seat 18, it counters the two foils 14 so as to diverge the foils 14 in a direction parallel to the second axis of symmetry 10.

According to an embodiment, when assembling the hinge 1, the conical dowels 17 are screwed into the respective dowel seats 18 according to a predefined screwing torque.

Advantageously, the predefined screwing torque ensures an optimal clearance reduction between the cross arms 11 and the arm guides 20, while ensuring a fluid and easy movement of the cross arms 11 within the arm guides 20.

According to an embodiment, the first hinge body 5 defines two dowel slots 22 facing a respective dowel seat 18.

The dowel slots 22 are configured so as to be crossed by the conical dowels 17 when the conical dowels 17 are screwed into the respective dowel seats 18.

The dowel slots 22 extend in a direction transverse to the first axis of symmetry 23, so as to accommodate a movement of the conical dowels 17 connected to the second hinge body 6 when the second hinge body 6 is moved in a direction transverse to the first axis of symmetry 23.

According to an embodiment, the adjustment means 7 comprise a movement member 24, configured to cause a movement of the second hinge body 6 with respect to the first hinge body 5, along a direction transverse to the first axis of symmetry 23.

According to an embodiment, the movement member 24 comprises an eccentric screw 25.

The eccentric screw 25 is screwable into a threaded seat 26 defined on the first hinge body 5, and is accommodated in a contrast slot 27 defined in the second hinge body 6 and facing the threaded seat 26.

The contrast slot 27 is defined by two opposite slot walls 28 interposed between two slot arcs 29.

The eccentric screw 25 is configured so that, when screwed into the threaded seat 26, it selectively counters one or the other of the two opposite slot walls 28, so as to move the second hinge body 6 selectively with respect to the first hinge body 5, along a direction transverse to the first axis of symmetry 23.

According to an embodiment, the threaded seat 26 is defined on the head guide 19, and the contrast slot 27 is defined on the cross head 12.

According to an embodiment, the adjustment means 7 comprise inclination means 30 configured to adjust the inclination of the second hinge body 6 relative to the first hinge body 5.

In particular, the inclination means 30 determine the angle defined by the intersection between a plane interpolating the second hinge body 6 and containing the second axis of symmetry 10, and a plane interpolating the first hinge body 5 and containing the first axis of symmetry 23.

According to an embodiment, the inclination means 30 comprise a maneuvering screw 31 rotatably connected to the first hinge body 5.

Thereby, the maneuvering screw 31 is axially constrained to the first hinge body 5, but freely rotatable with respect to the first hinge body 5.

According to a preferred embodiment, the maneuvering screw 31 is rotatably connected to the first hinge body 5 by means of a geometrical connection provided between a coupling groove 32 defined by the maneuvering screw 31 and a keyhole 33, also known as "Euro profile", defined in the first hinge body 5 at the maneuvering screw 31.

Advantageously, the keyhole 33 and the sizing of the cross element 8 and the cross guide 9 prevent accidental disconnection between the second cross body 6 and the maneuvering screw 31 inserted through the keyhole 33.

The inclination means 30 further comprise a maneuvering nut 34 defined in the second hinge body 6.

The maneuvering nut 34 is configured to mesh with the maneuvering screw 31.

Moreover, the inclination means 30 comprise a hinging pin 35.

The hinging pin 35 extends to pass through the first hinge body 5 and the second hinge body 6, in a direction transverse to both the first axis of symmetry 23 and the second axis of symmetry 10, and in a direction transverse to the maneuvering screw 31.

According to an embodiment, the hinging pin 35 is configured so as to hinge the cross head 12 of the second hinge body 6 at the head guide 19 of the first hinge body 5.

Advantageously, by means of the thus-configured inclination means 30, a screwing or unscrewing of the maneuvering screw 31 with the maneuvering nut 34 results in a rotation of the second hinge body 6 with respect to the first hinge body 5, about the hinging pin 35.

Advantageously, the thus-configured inclination means 30 allow achieving the angular adjustment of the first hinge body 5 with respect to the second hinge body 6, and thus of the door 4 with respect to the shoulder 3.

According to an embodiment, the second hinge body 6 comprises a connection pin 36.

The second hinge body 6 can be hinged to the door 4 of the piece of furniture 2 by means of the connection pin 36.

Moreover, the second hinge body 6 defines a cylindrical seat 37 configured to house the connection pin 36.

The cylindrical seat 37 is defined at an end of the second hinge body 6 opposite to the first hinge body 5 and extends transversely to the second hinge body 6 between two cylindrical seat ends 38.

According to an embodiment, two bushings 39 are housed in the cylindrical seat 37 at a respective cylindrical seat end 38.

The bushings 39 are interposed between the cylindrical seat 37 and the connection pin 36.

Advantageously, the bushings 29 considerably reduce the noise being generable by the rotation of the connection pin 36 inside the cylindrical seat 37.

According to an embodiment, the first hinge body 5 comprises snap connection means 40 for the connection of the first hinge body 5 to the shoulder 3 of the piece of furniture 2.

The snap connection means 40 are provided at an end of the first hinge body 5 opposite to the second hinge body 6.

According to an embodiment, the snap connection means 40 comprise a button 41.

The button 41 is housed in a button seat 42 defined in the first hinge body 5.

The button 41 is elastically biased to exit from the button seat 42 by means of an elastic element 43.

The button 41 is thus retractable into the button seat 42 by acting against the action of the elastic element 43.

According to an embodiment, an upperwall of the button 41 opposite to the button seat 42 forms an inclined plane 44.

The inclined plane 44 is configured so that a movement of the first hinge body 5 inside the shoulder 3 of the piece of furniture 2 moves the button 41 towards the interior of the button seat 42.

According to an embodiment, the first hinge body 5 and the second hinge body 6 are made of steel or brass.

According to a further aspect of the invention, a piece of furniture 2 comprises at least one shoulder 3 and one door 4.

The at least one door 4 is connected to the at least one shoulder 3 by means of at least one hinge 1 as previously described. The door 4 is movable with respect to the shoulder 3 from an opening position to a closing position, and vice versa.

According to an embodiment, the at least one shoulder 3 defines a pocket 45 configured to house the first hinge body 5 of the hinge 1 in a concealed manner.

According to an embodiment, the shoulder 3 defines an opening hole 46 opening into the pocket 45.

The opening hole 46 is configured to provide a geometric coupling with the button 41 of hinge 1 elastically biased to exit from the hinge 1.

Therefore, the hinge 1 can be coupled to the shoulder 3 of the piece of furniture 2 by inserting the first hinge body 5 into the pocket 45. The insertion of the first hinge body 5 into the pocket 45 biases the button 41 against the elastic element 43, thus retracting the button 41 inside the button seat 42.

The first hinge body 5 is advanceable into the pocket 45 so that the button 41 is positioned opposite to the opening hole 46, so that the button 41, biased by the elastic element 43, is inserted into the opening hole 46, thus providing the geometric coupling between the hinge 1 and the shoulder 3.

According to an embodiment, the at least one door 4 is hinged to the hinge 1 by means of the connection pin 36.

According to an embodiment, the piece of furniture 2 comprises at least a first magnet 47 positioned at the shoulder 3 and at least a second magnet 47 positioned at the door 4.

The first and second magnets 47 are positioned so as to face each other when the door 4 is in a closing position.

The first and second magnets 47 are configured so as to ensure a correct closing of the door 4 when the door 4 is close to the closing position thereof.

In particular, the first and second magnets 47 are configured so as to apply a force of attraction which biases the door 4 to the closing position.

Those skilled in the art will naturally be able to make changes or adaptations to the present invention, without however departing from the scope of the following claims.

The invention claimed is:

1. A hinge for a piece of furniture comprising at least one shoulder and at least one door, said hinge comprising:
- a first hinge body; and
- a second hinge body;
- wherein the first hinge body is connectable to the at least one shoulder of the piece of furniture and the second hinge body is connectable to the at least one door of the piece of furniture;
- wherein the first hinge body and the second hinge body are operatively connected to each other and relatively movable by means of adjustment means;
- wherein one of the first hinge body and the second hinge body comprises a cross element and the other of the first hinge body or the second hinge body defines a cross guide;
- wherein the cross element is housed in the cross guide;
- wherein the cross element is slidable in the cross guide by means of the adjustment means;
- wherein the first hinge body defines the cross guide, and the second hinge body comprises the cross element; and
- wherein the cross element forms two cross arms extending in transverse direction with respect to a second axis of symmetry and opposite to each other with respect to the second axis of symmetry, wherein each cross arm forms two foils divided from each other by a slit extending from an end of the cross arm in direction of the second axis of symmetry, and wherein the adjustment means comprise a calibration member positioned at each slit and configured to adjust the spacing between the two foils of each cross arm.

2. A hinge according to claim 1, wherein the cross element is made in a single piece with the second hinge body.

3. A hinge according to claim 1, wherein the first hinge body is substantially symmetrical with respect to a first axis of symmetry, wherein the second hinge body defines a second axis of symmetry, wherein the first axis of symmetry is parallel to the second axis of symmetry,
- wherein the cross element forms:
- two cross arms extending in transverse direction with respect to the second axis of symmetry and opposite to each other with respect to the second axis of symmetry,
- a cross head extending in direction of the second axis of symmetry and facing the first hinge body, a cross foot extending in direction of the second axis of symmetry and opposite to the cross head, wherein the first hinge body defines the cross guide shaped so as to provide a geometric coupling with the cross element and accommodate the adjustment stroke of the cross element, in a direction which is transverse to the first axis of symmetry, and wherein the cross guide defines:

a head guide shaped to house the cross head and accommodate the stroke of the cross head in a direction which is transverse to the first axis of symmetry, two arm guides shaped to house the respective cross arms and accommodate the stroke of the cross arms in a direction which is transverse to the first axis of symmetry, and a foot guide shaped to house the cross foot and to accommodate the stroke of the cross foot in a direction which is transverse to the first axis of symmetry.

4. A hinge according to claim 1, wherein the calibration member comprises a conical dowel which is screwable in a dowel seat defined at each slit, wherein the conical dowel is configured so that when housed in the dowel seat, it counters the two foils so as to diverge the foils in a direction which is parallel to the second axis of symmetry.

5. A hinge according to claim 4, wherein the conical dowels are screwed into the respective dowel seats according to a predefined screwing torque.

6. A hinge according to claim 4, wherein the first hinge body defines two dowel slots facing a respective dowel seat, wherein the dowel slots are configured so as to be crossed by the conical dowels when the conical dowels are screwed into the respective dowel seats, and wherein the dowel slots extend in a direction which is transverse to the first axis of symmetry so as to accommodate a movement of the conical dowels connected to the second hinge body when the second hinge body is moved in a direction which is transverse to the first axis of symmetry.

7. A hinge according to claim 1, wherein the first hinge body substantially is symmetrical with respect to a first axis of symmetry, wherein the second hinge body defines a second axis of symmetry, wherein the first axis of symmetry is parallel to the second axis of symmetry, and wherein the adjustment means comprise a movement member configured to cause a movement of the second hinge body with respect to the first hinge body, along a direction which is transverse to the first axis of symmetry.

8. A hinge according to claim 7, wherein the movement member comprises an eccentric screw, said eccentric screw being screwable in a threaded seat defined on the first hinge body and being accommodated in a contrast slot defined in the second hinge body and facing the threaded seat, said contrast slot being defined by two opposite slot walls interposed between two slot arcs, wherein the eccentric screw is configured so that, when it is screwed into the threaded seat, it selectively counters one or the other of the two opposite slot walls, so as to selectively move the second hinge body with respect to the first hinge body, along a direction which is transverse to the first axis of symmetry.

9. A hinge according to claim 8, wherein the threaded seat is defined on the head guide, and the contrast slot is defined on the cross head.

10. A hinge according to claim 1, wherein the adjustment means comprise inclination means configured to adjust the inclination of the second hinge body relative to the first hinge body.

11. A hinge according to claim 10, wherein the first hinge body is substantially symmetrical with respect to a first axis of symmetry, wherein the second hinge body defines a second axis of symmetry, wherein the first axis of symmetry is parallel to the second axis of symmetry, and wherein:

the inclination means comprise:

a maneuvering screw rotatably connected to the first hinge body, a maneuvering nut defined in the second hinge body, said maneuvering nut being configured to mesh with the maneuvering screw, a hinging pin which extends passing through the first hinge body and the second hinge body, in a direction which is transverse to the first axis of symmetry and to the second axis of symmetry, and in a direction which is transverse to the maneuvering screw.

12. A hinge according to claim 11, wherein the maneuvering screw is rotatably connected to the first hinge body by means of a geometrical connection provided between a coupling groove defined by the maneuvering screw and a keyhole defined in the first hinge body at the maneuvering screw.

13. A hinge according to claim 11, wherein the hinging pin is configured so as to hinge the cross head of the second hinge body at the head guide of the first hinge body.

14. A hinge according to claim 1, wherein the second hinge body comprises a connection pin, and wherein the second hinge body can be hinged to the door of the piece of furniture by means of the connection pin, wherein the second hinge body defines a cylindrical seat configured to house the connection pin, said cylindrical seat being defined at an end of the second hinge body opposite to the first hinge body and extending transversely to the second hinge body between two cylindrical seat ends, wherein two bushings are housed in the cylindrical seat at a respective cylindrical seat end, said bushings being interposed between the cylindrical seat and the connection pin.

15. A hinge according to claim 1, wherein the first hinge body comprises snap connection means for the connection of the first hinge body to a shoulder of a piece of furniture, wherein the snap connection means are made at an end of the first hinge body opposite to the second hinge body.

16. A hinge according to claim 15, wherein the snap connection means comprise a button accommodated in a button seat defined in the first hinge body, wherein the button is elastically biased exiting from the button seat by means of an elastic element and is retractable within the button seat by acting against the action of the elastic element.

17. A hinge according to claim 16, wherein an upper wall of the button opposite to the button seat forms an inclined plane, wherein the inclined plane is configured so that a movement of the first hinge body in a shoulder of a piece of furniture moves the button towards the inside of the button seat.

18. A piece of furniture comprising at least one shoulder and at least one door which can be moved with respect to the shoulder from an opening position to a closing position, and vice versa, and wherein the at least one door is connected to the at least one shoulder by means of at least one hinge according to claim 1.

19. A piece of furniture according to claim 18, wherein the at least one shoulder defines:

a pocket configured to house the first hinge body of the hinge in a concealed manner, an opening hole opening into the pocket, wherein the opening hole is configured to provide a geometric coupling with a button of the hinge which is elastically biased exiting from the hinge.

20. A piece of furniture according to claim 18, wherein the at least one door is hinged to the hinge by means of a connection pin.

21. A piece of furniture according to claim 18, comprising at least a first magnet positioned at the shoulder and at least a second magnet positioned at the door, wherein the first and the second magnets are positioned so as to face each other when the door is in a closing position, and wherein the first and the second magnets are configured so as to apply a force of attraction which biases the door in closing position.

* * * * *